United States Patent
Tavares Miranda

(10) Patent No.: US 12,479,534 B2
(45) Date of Patent: Nov. 25, 2025

(54) DRIVE SYSTEM COMPRISING A DRIVE SHAFT AND A CHAINRING

(71) Applicant: MIRANDA & IRMAO, LDA., Agueda (PT)

(72) Inventor: Joao Filipe Tavares Miranda, Agueda (PT)

(73) Assignee: MIRANDA & IRMAO, LDA., Agueda (PT)

( * ) Notice: Subject to any disclaimer, the term of this patent is extended or adjusted under 35 U.S.C. 154(b) by 0 days.

(21) Appl. No.: 18/744,024

(22) Filed: Jun. 14, 2024

(65) Prior Publication Data

US 2024/0417033 A1 Dec. 19, 2024

(30) Foreign Application Priority Data

Jun. 16, 2023 (DE) .................. 10 2023 115 800.7

(51) Int. Cl.
*B62M 9/10* (2006.01)
*B62M 1/36* (2013.01)
*B62M 17/00* (2006.01)

(52) U.S. Cl.
CPC .............. *B62M 9/105* (2013.01); *B62M 1/36* (2013.01); *B62M 17/00* (2013.01)

(58) Field of Classification Search
USPC ........................................................ 474/160
See application file for complete search history.

(56) References Cited

U.S. PATENT DOCUMENTS 3,477,303 A * 11/1969 Brilando .................. B62M 9/10
474/144
4,472,163 A * 9/1984 Bottini ..................... B62M 9/10
192/64

(Continued)

FOREIGN PATENT DOCUMENTS

DE 102015000715 A1 8/2015
EP 0002964 A1 7/1979

(Continued)

OTHER PUBLICATIONS

Extended European Search Report (EESR), mailed on Oct. 30, 2024, issued for the corresponding Application No. EP 24 18 0581, 8 pages.

(Continued)

*Primary Examiner* — Henry Y Liu
(74) *Attorney, Agent, or Firm* — LUCAS & MERCANTI, LLP

(57) ABSTRACT

A drive system comprising a drive shaft (21) and a chainring (1), wherein the drive shaft (21) has a splined interface (22) for attaching the chainring (1) in a rotationally fixed manner. The drive system has an annular adapter (2) having a radially inner surface with an interface (20) engaging the splined interface (22) of the drive shaft (21) and a radially outer region with at least one first connecting element, wherein the chainring (1) has at least one second connecting element configured to engage the first connecting element, wherein the drive system comprises a first annular adapter (2) with a first axial extension defining a first axial distance between the interface (20) and the first connecting element and a second annular adapter with a second axial extension defining a second axial distance between the interface (20) and the first connecting element.

9 Claims, 6 Drawing Sheets

(56) References Cited

U.S. PATENT DOCUMENTS

| | | | | |
|---|---|---|---|---|
| 9,302,736 | B2* | 4/2016 | Iwai | B62M 9/10 |
| 9,914,502 | B2* | 3/2018 | Wu | B62M 9/105 |
| 10,377,445 | B2* | 8/2019 | Hirose | B62M 9/12 |
| 10,550,925 | B2* | 2/2020 | Akanishi | B62M 9/00 |
| 11,014,628 | B2* | 5/2021 | Choltco-Devlin | F16H 55/30 |
| 11,505,277 | B1* | 11/2022 | Yamanaka | B62M 3/00 |
| 11,713,801 | B2* | 8/2023 | Akanishi | F16H 55/30 474/152 |
| 11,719,325 | B2* | 8/2023 | Winans | F16H 55/303 474/156 |
| 11,788,615 | B2* | 10/2023 | Moore | B62M 9/105 474/152 |
| 11,851,135 | B2* | 12/2023 | Choltco-Devlin | B62M 9/105 |
| 11,999,439 | B2* | 6/2024 | Choltco-Devlin | F16H 55/30 |
| 12,060,928 | B2* | 8/2024 | Moore | B22D 21/007 |
| 12,091,133 | B2* | 9/2024 | Choltco-Devlin | B62M 1/36 |
| 12,098,761 | B2* | 9/2024 | Winans | F16G 13/06 |
| 12,187,378 | B2* | 1/2025 | Tavares Miranda | B62M 1/36 |
| 2007/0000153 | A1* | 1/2007 | Harrington | B62M 3/003 36/131 |
| 2008/0314193 | A1* | 12/2008 | Meggiolan | B62M 3/00 74/594.1 |
| 2010/0064845 | A1* | 3/2010 | French | B62M 3/00 29/527.2 |
| 2010/0167881 | A1* | 7/2010 | Day | B62M 1/36 74/594.1 |
| 2013/0008282 | A1* | 1/2013 | Johnson | B62M 3/00 74/594.2 |
| 2015/0082939 | A1* | 3/2015 | Meyer | B62M 3/00 74/594.2 |
| 2015/0217834 | A1* | 8/2015 | Iwai | B62M 9/10 474/152 |
| 2016/0114859 | A1* | 4/2016 | Tsai | B62M 9/10 474/160 |
| 2017/0174288 | A1* | 6/2017 | Wu | B62M 9/105 |
| 2017/0274960 | A1* | 9/2017 | Dubois | B62M 3/003 |
| 2017/0292598 | A1* | 10/2017 | Moore | B62M 9/105 |
| 2018/0037296 | A1* | 2/2018 | Hamamoto | F16F 15/1245 |
| 2018/0043203 | A1* | 2/2018 | Seol | A63B 22/0605 |
| 2018/0079467 | A1* | 3/2018 | Hirose | F16H 55/30 |
| 2018/0134340 | A1* | 5/2018 | Emura | B62M 9/12 |
| 2018/0347680 | A1* | 12/2018 | Akanishi | B62M 9/00 |
| 2019/0017586 | A1* | 1/2019 | Sugimoto | B62M 9/105 |
| 2019/0162287 | A1* | 5/2019 | Hamamoto | B62M 6/55 |
| 2019/0185108 | A1* | 6/2019 | Bush | F16H 55/12 |
| 2019/0195331 | A1* | 6/2019 | Hanke | B62M 9/02 |
| 2020/0001945 | A1* | 1/2020 | Hamamoto | F16F 15/12 |
| 2020/0200253 | A1* | 6/2020 | Klawer | B62M 9/105 |
| 2020/0256446 | A1* | 8/2020 | Klawer | B62M 9/02 |
| 2023/0127274 | A1* | 4/2023 | Tavares Miranda | B62M 9/00 474/160 |

FOREIGN PATENT DOCUMENTS

| | | |
|---|---|---|
| EP | 0647192 B1 | 1/1996 |
| FR | 2611642 A1 | 9/1988 |
| TW | M 530 778 U | 10/2016 |
| TW | M 576 561 U | 4/2019 |
| WO | 2020211723 A1 | 10/2020 |
| WO | 2022/183252 A1 | 9/2022 |

OTHER PUBLICATIONS

Office Action for Corresponding German Patent Application No. 10 2023 115 800.7, issued Feb. 2, 2024 and English translation; 8 pages.

* cited by examiner

Fig. 1
Fig. 2
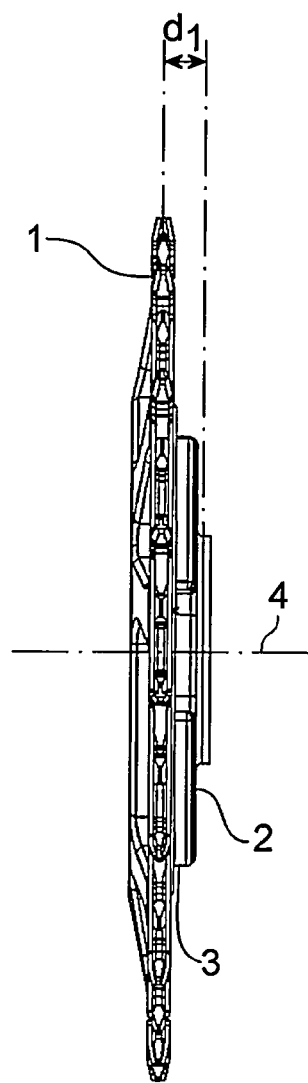
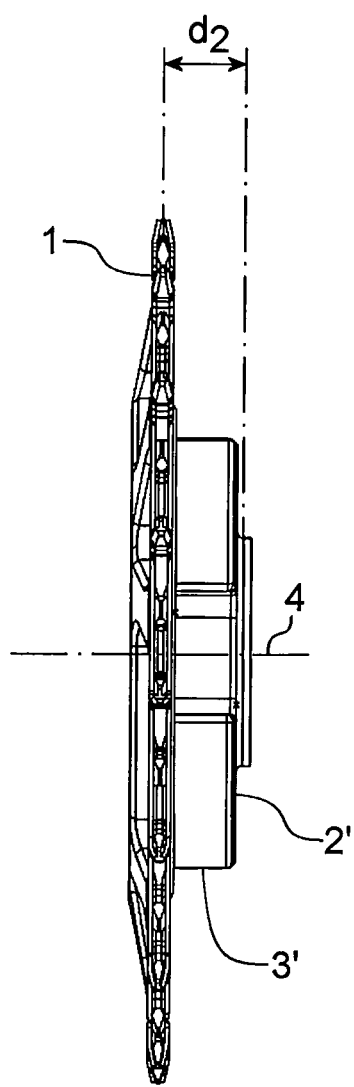

DRIVE SYSTEM COMPRISING A DRIVE SHAFT AND A CHAINRING

CROSS-REFERENCE TO RELATED APPLICATION

This application claims priority of German Patent Application No. 10 2023 115 800.7, filed on Jun. 16, 2023, the content of which is incorporated herein by reference.

TECHNICAL FIELD

The invention relates to a drive system comprising a drive shaft and a chainring, wherein the drive shaft has splines for attaching the chainring in a rotationally fixed manner.

BACKGROUND ART

Chain drives of the type in question are used in particular for two-wheeled vehicles. These may be bicycles operated purely by human muscle power, as well as bicycles with an additional drive, especially bicycles with an additional electric drive, for example so-called e-bikes and/or pedelecs. However, such chain drives can also be used in other technical equipment, such as ergometers, pedal boats, go-karts or similar.

The chainring is most commonly fixed to a chainring mount, also called spider, that attaches the chainring to a toothed interface of a drive shaft. Such star-shaped chainring spiders usually have finger-like protrusions which extend—in a star shape—away from the center of the axis of rotation of the chainring and have connecting areas at their outer ends. They can be connected to the chainrings via these connecting areas using suitable connecting elements. The connecting elements are usually bolts or screws, which are designed in a way that is optimized for the purpose of connecting the chainring to the pedal crank.

The drive shaft may be the toothed end of a spindle of a bottom bracket or a toothed cylindrical protrusion of a pedal crank that is to be fitted onto one end of the bottom bracket spindle. In the case of e-bikes, the chainring mount may be fixed to the drive shaft of an electric motor. The splines on the drive shaft engage an opposite interface of the chainring in a rotationally fixed manner.

The documents EP 0 002 964 A1, WO 2020/211 723 A1, and DE 10 2015 000 715 A1 show examples of fitting the toothed ring to the spider or the chainring mount in a form fitting manner. US 2023 0127274 A1 of the applicant discloses a form fitting connection between the chainring and a pedal crank. EP 0 647 192 B1 proposes a chainring adapter having a cylindrical shape with axial grooves for receiving protrusions at an inner circumference of the chainring. Multiple chainrings are mounted on the adapter with multiple spacer rings therebetween and the chainrings are fixed to the adapter by means of a right-hand thread at the frame side of the adapter onto which a locking ring or the smallest chainring is screwed.

Such adapters are difficult to produce and the entire system has a complex structure that is difficult to mount.

SUMMARY OF INVENTION

It is an object of the invention to provide a drive system with a simple design that offers increased flexibility compared to known drive systems.

The object is attained by a drive system comprising the features of claim 1. The dependent claims propose practical embodiments of this system.

According to claim 1, the drive system comprises a drive shaft and a chainring, wherein the drive shaft has splines for attaching the chainring in a rotationally fixed manner, and an annular adapter having a radially inner surface with an interface engaging the splines of the drive shaft and a radially outer region with a connecting system that may be similar to the connecting system of applicant's system described in US 2023 0127274 A1 for providing a form fitting connection between the chainring and a pedal crank. For this purpose, the adapter has at least one first connecting element, wherein the chainring has at least one second connecting element configured to engage said first connecting element.

According to the proposal described herein, the drive system comprises a first annular adapter with a first axial extension defining a first axial distance between the interface and the first connecting element and a second annular adapter with a second axial extension defining a second axial distance between the interface and the first connecting element. In an embodiment, the adapter may have a set of first connecting elements and the chainring may have a corresponding set of second connecting elements each of which matches a first connecting element.

It is to be noted that the term "annular adapter" describes a piece made of metal or fiber reinforced plastic having the shape of a ring in plan view parallel to the axis of rotation of the chainring. The adapter has a minimum axial extension so that its circumferential surface is large enough to accommodate the first connecting element. The axial extensions of the at least two annular adapters of the system vary so that the axial distances between the interface and the first connecting element vary. In other words, the first connecting element defines the plane of the chainring. The at least two adapters have different axial distances between the position of the first connecting element and thus the plane of the chainring and the plane of the interface where the adapter is fixed to the drive shaft. Consequently, the at least two adapters fix the chainrings in different planes with respect to the drive shaft that is fixed at a given position to the frame of the vehicle, in particular bicycle.

The present drive system is designed for fixing the driving chainring to the drive shaft, in case of a bicycle, to the spindle of a bottom bracket directly or via a splined interface of a crank that is fixed to the spindle of a bottom bracket. In case of an e-bike, the chainring may be fixed to the drive shaft of an electric drive. The chain links this driving chainring with the sprockets that are fixed to the wheel.

The chain runs from the sprockets of the wheel along a chainline to the driving chainring. The term "chainline" describes the center line of the chain. Ideally, both the driving chainring and the sprocket engaging the chain should be in the same plane, so that the chain is not subject to sideward forces or lateral stress.

Geared bicycles commonly have at least a rear derailleur that allows the chain to engage multiple chainrings or sprockets arranged in adjacent planes. This changing of gears moves the chain out of the ideal chainline and the chainline is not perfect in most gears. In most cases, the ideal chainline extends from the center of the sprocket cassette on the rear wheel to the front chainring. Chainline mismatch can cause the chain to rub against the side of an outer, larger chainring when engaged with a smaller one, and can cause problems with gear shifting. It is necessary to find a compromise for the different gears of a bicycle in order to set up the best possible chainline for all available gears.

The proposed system provides an easy option for adjusting the chainline individually for each bicycle. The ideal chainline differs depending on the number of sprockets at the wheel and depending on the number of driving sprockets. Also, the plane of the interface may vary depending on the construction of the bottom bracket, the crank or the electric drive. With the proposed system it is easy to select an adapter with an appropriate axial displacement of the plane of the chainring to the center plane of the interface connecting the adapter to the drive shaft.

One of the adapters may have a zero displacement of the planes, i.e. the plane of the chainring may match the center plane of the interface. The other adapters have different axial displacements between the chainring and the interface, and the multitude of adapters offers a simple means of selecting the correct adapter for a specific drive system. The drive system is also useful for changing the configuration of a bicycle. If it is desired to replace the original cassette of a bicycle with a different cassette having a different number of sprockets fixed to the wheel, it may be helpful to change the adapter so that the chainline is varied to match the new cassette of sprockets.

As explained above, the adapter can have a set of first connecting elements and the chainring can have a corresponding set of second connecting elements. In a practical embodiment, the first connecting elements and the second connecting elements can be fitted into one another in an assembly position, and the annular adapter and the chainring can be rotated relative to one another about the axis of rotation of the chainring into a stop position in which stop surfaces of the adapter and the chainring abut against each other.

In particular, the first connecting elements in the radially outer region of the annular adapter may be grooves that extend circumferentially over a portion of the cylindrical outer surface of the adapter. The grooves have an insertion opening extending in an axial direction to a lateral face of the adapter at one end and a first stop surface at the other end. The second connecting elements may be protrusions on a radially inner surface of the chainring configured to be inserted into said insertion openings and rotated into said grooves. The front surfaces of the protrusions are the second stop surfaces and abut the first stop surfaces in the stop position. This configuration is similar to the configuration for fixing a chainring to a pedal crank described by the applicant in US 2023 0127274 A1.

For mounting the chainring to the adapter, the protrusions of the chainring are pushed into the insertion openings of the adapter in a direction parallel to the axis of rotation of the chainring. The subsequent relative rotational movement between the adapter and the chainring around this axis of rotation moves the protrusions of the chainring into the stop position. In other words, the adapter and the chainring, are joined together in the manner of a bayonet mount. A positive fit may be created, for example by one or more undercuts, which are formed between the groove and the protrusion. In the stop position, further rotation between the chainring and the adapter in the direction of rotation from the assembly position towards the stop position is blocked.

In this stop position, the chainring may be secured or locked with respect to the adapter by suitable means. This will prevent the chainring from being unintentionally released from the adapter through an opposite rotational movement, i.e. a rotational movement from the stop position towards the assembly position. For locking the adapter and the chainring in the stop position, the drive system may further comprise a locking element, for example a locking screw configured to be screwed into a screw hole in the annular adapter, in the chainring or both.

In practice, the annular adapter may have at least three first connecting elements distributed at regular intervals over the circumference of the annular adapter and wherein the chainring has a matching number of second connecting elements located at matching positions. The form fitting connection may be achieved with only two connecting elements or one connecting element. However, three connecting elements achieve a better distribution of the forces transmitted from the drive shaft to the chainring over the entire circumference of the adapter. The drawings will describe an embodiment with four first connecting elements and matching second connecting elements. However, this number is not limiting for the person skilled in the art and he readily understands that a lower or a higher number of first and matching second connecting elements can be chosen.

The person skilled in the art also understands that a second set of first connecting elements may be arranged on the adapter in a plane parallel to and at a distance from the first set of first connecting elements. This second set of first connecting elements may serve to receive second connecting elements of a second chainring so that the adapter may carry two chainrings.

Further sets of first connecting elements may be provided on the same adapter for further chainrings.

As described earlier, the drive shaft of the drive system described herein may be the spindle of a bottom bracket. Modern bottom brackets have splined interfaces at the end of the spindle for fixing the pedal crank. Such interfaces may have different shapes, for example ISIS interfaces or Octalink (trademark) interfaces. The adapter may have a matching interface that fits onto the interface of the spindle. Alternatively, the pedal crank may have a cylindric protrusion that extends towards the bottom bracket and comprises splines. The inner shape of the annular adapter may have matching contours and fit onto the splines of this cylindric protrusion. The cylindric protrusion of the pedal crank is the drive shaft in this case. In the case of e-bikes, the drive shaft usually coincides with the shaft of the electric motor.

The adapter may be made of aluminum or another suitable metal alloy, in particular a zinc based metal alloy, for example a Zamak alloy. It may also be possible to produce the adapter of a carbon fiber or glass fiber reinforced plastic material. The preferred material for the chainring is steel.

The adapter is easy to mount as described above. It is just as easy to dismount the adapter or the chainring attached to it. As a consequence, the adapter allows for easy replacement of any worn part whenever necessary. It is not necessary to replace the entire drive system if only one part needs replacement. As also stated above, the adapter system with different adapters for different chainlines also facilitates changes to the configuration of a drive system. In case of changing a bottom bracket or a cassette on the rear wheel of a bicycle it may be helpful to change the adapter in order to adjust the chainline to the requirements of the new configuration.

Thus, the present invention also concerns a method for manufacturing a vehicle with a chain drive.

BRIEF DESCRIPTION OF DRAWINGS

A practical embodiment of the chain drive system is described below with reference to the attached drawings.

FIG. 1 shows a front view of a first assembly comprising a chainring and a first annular adapter of the system described herein.

FIG. 2 shows a front view of a second assembly comprising the chainring of FIG. 1 and a second annular adapter.

DESCRIPTION OF EMBODIMENTS

Figure 3:
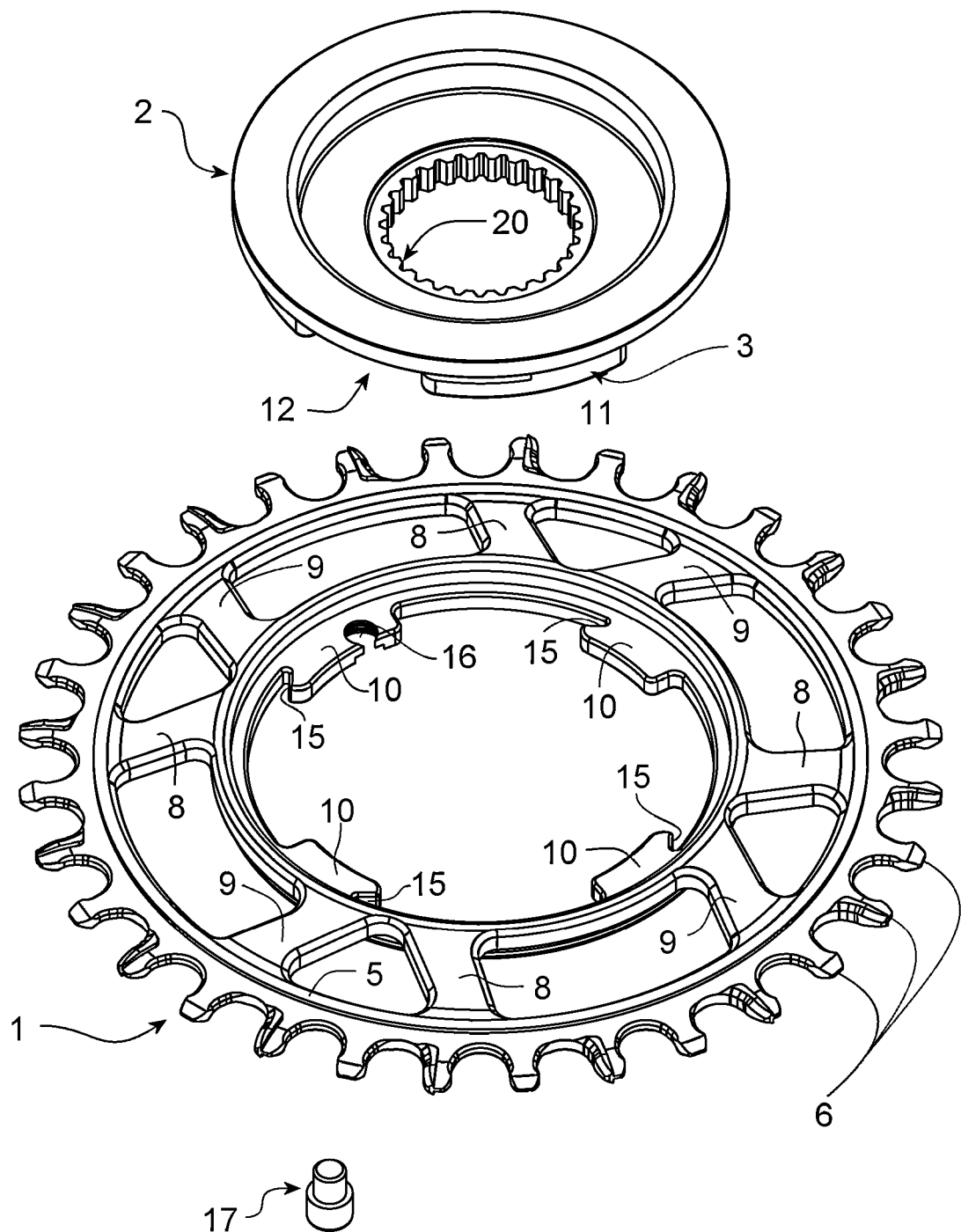
FIG. 3 shows an exploded view of the first assembly viewed from the adapter side.

FIG. 1 and FIG. 2 show respective front views of two assemblies comprising identical chainrings 1 and two different annular adapters 2, 2'. The chainring 1 in FIG. 1 and FIG. 2 has a central axis of rotation 4 illustrated in dotdashed lines. The annular adapters 2, 2' are located in the central area of the chainring 1. Adapter 2 shown in FIG. 1 has a short axial extension in the direction parallel to the axis of rotation 4 of the chainring 1. It has an outer peripheral wall 3 with a generally cylindrical surface extending over a short distance. The overall axial extension of the adapter 2 may be, for example 12.5 mm. The resulting axial distance d1 between the between an interface 20 for fixing the first adapter 2 to a spindle (see FIG. 9) and the central plane of the chainring 1 is short. The annular adapter 2' shown in FIG. 2 has a long axial extension. It has a generally cylindrical outer peripheral wall 3' extending over a long distance so that it's overall axial extension may be, for example 20 mm. The resulting axial distance d2 between the between an interface 20 for fixing the second adapter 2' to the spindle and the central plane of the chainring 1 is longer than the corresponding distance d1 of the first adapter 2.

The right hand side of the adapters 2, 2' in FIGS. 1 and 2 is configured to abut a contact surface of a drive shaft, for example a flange of a drive shaft of an electric drive. It is apparent to the person skilled in the art that the distance of the central plane of the chainring 1 from the flange of the drive shaft varies with the overall axial extension of the adapter 2, 2'. If the first adapter 2 is used, the central plane of the chainring 1 is close to said flange. If the second adapter 2' is used, the central plane of the chainring 1 is further away from said flange. The position of the central plane of the chainring 1 defines the chainline off the chain drive. The proposal of providing a variety of adapters with different overall axial extensions allows for configuring the ideal chainline by simply selecting the appropriate adapter.

Figure 4:
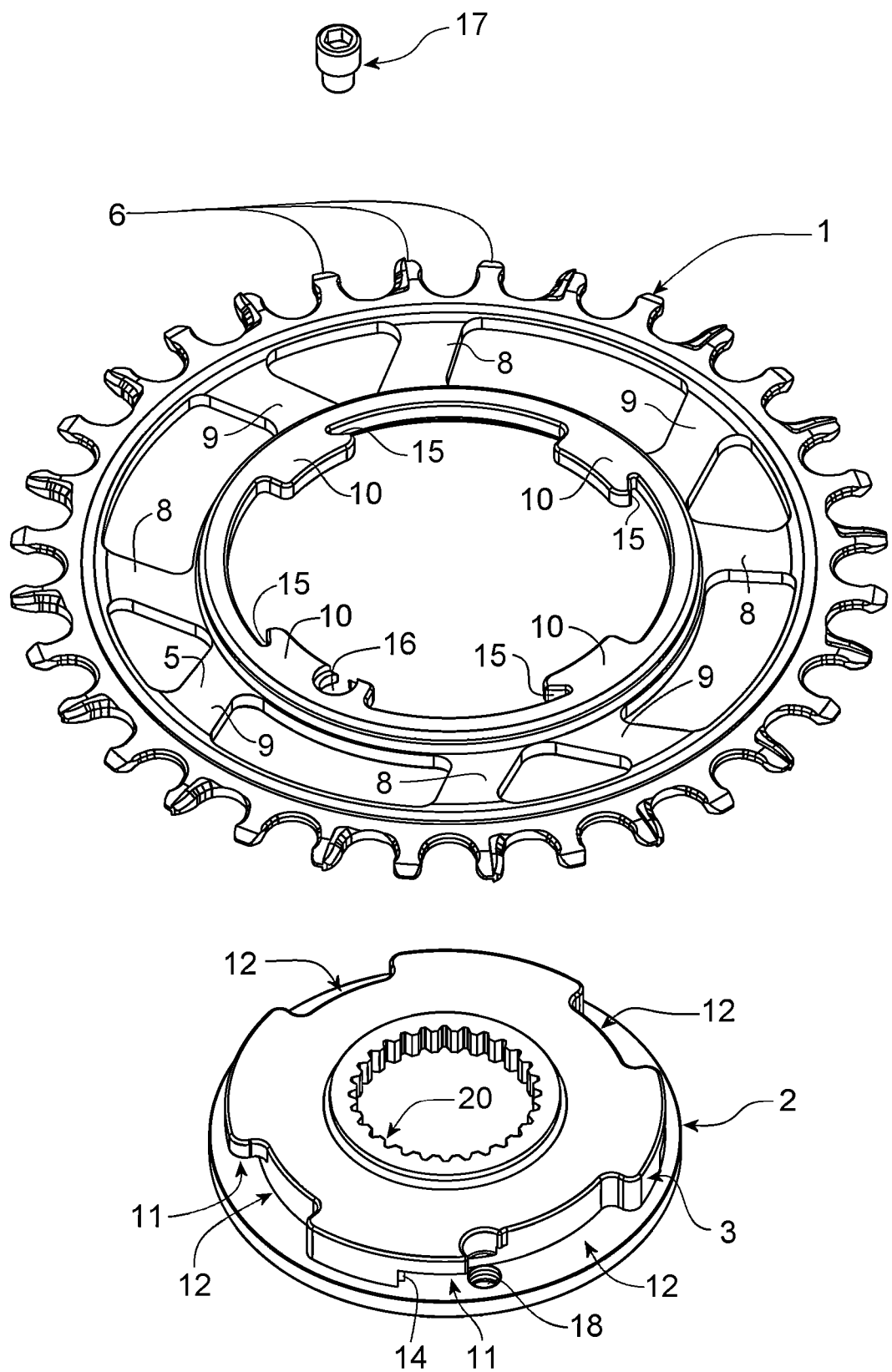
FIG. 4 shows an exploded view of the first assembly viewed from the chainring side.
Figure 5:
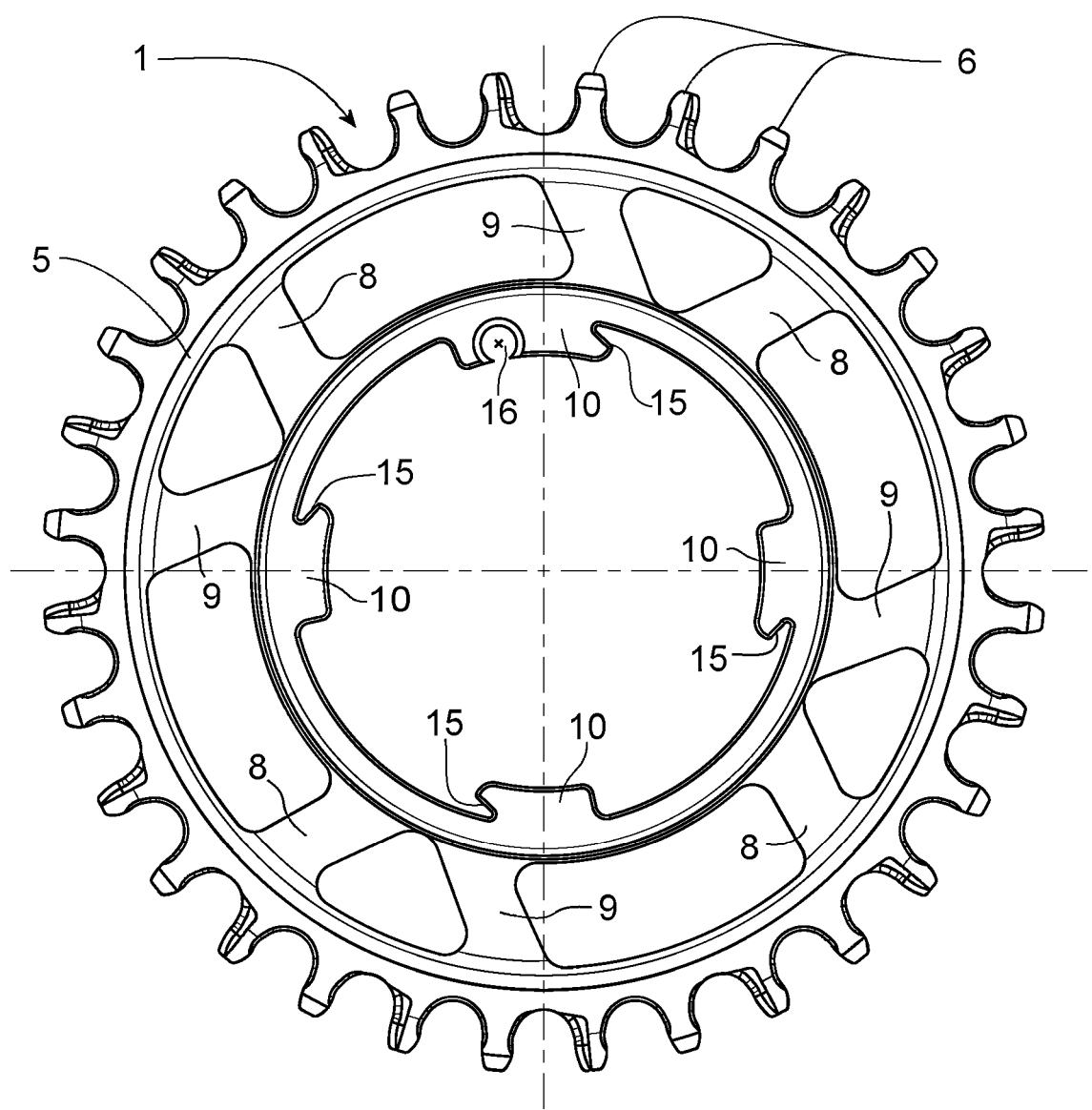
FIG. 5 shows a plan view of the chainring of FIGS. 1-4.

FIG. 3 and FIG. 4 illustrate the constructional details including the connecting elements of the chainring 1 and the adapter 2. The chainring 1 has an outer ring section 5 carrying multiple peripheral teeth 6. The chainring 1 has 32 teeth as can be seen in FIGS. 3 and 4. Only three of these teeth are marked with reference lines. It is apparent to the person skilled in the art that the number of teeth can be adjusted to the requirements of this specific drive. The outer ring section 5 is connected to an inner ring section 7 by means of struts or arms 8 and 9. However, it is apparent to the person skilled in the art that the chainring 1 may have a different configuration for example, a massive ring section with a large width or a large ring section with bores or apertures for reducing the weight.

The inner ring section 7 comprises 4 radial protrusions 10 extending towards the center of the chainring 1. These protrusions 10 constitute second connecting elements for attaching the chainring 1 to the adapter 2 in a rotationally fixed manner.

The adapter 2 has four grooves 11 in the peripheral surface 3. These grooves 11 constitute the first connecting elements for attaching the chainring 1 to the adapter 2. One end of each groove 11 opens into an insertion opening 12 that extends to the lateral face 13 of the adapter 2. The shape of each insertion opening 12 matches the shape of a radial protrusion 10 of the chainring 1. The other end of each groove 11 is closed and constitutes a stop surface 14 that matches a front surface 15 of the radial protrusion 10, the front surface 15 forming the second stop surface. Both stop surfaces 14 and 15 extend in the radial direction so that forces in the circumferential direction can be transmitted from the adapter 2 to the chainring 1. The front surface 15 of the radial protrusion 10 has an undercut and the corresponding stop surface 14 of the adapter two has a matching shape.

For fixing the chainring 1 to the adapter 2, the chainring 1 is placed on the adapter 2 so that the protrusions 10 are accommodated in the corresponding insertion openings 12. For example, in FIG. 4 the chainring 1 is lowered onto the adapter 2 so that each of the protrusions 10 is located in one of the insertion openings 12. Then, the chainring 1 is rotated from the assembly position about its axis of rotation, in a clockwise direction in FIG. 4. Each of the protrusions 10 slides into a corresponding groove 11 until the stop surface 15 of each protrusion 10 of the chainring 1 abuts the corresponding stop surface 14 of the respective groove 11. This position is referred to as the stop position.

One of the protrusions 10 has a through hole 16 for a locking screw 17. The adapter 2 has a threaded hole 18 for receiving the thread of the locking screw 17. The threaded hole 18 is aligned with the through hole 16 in the stop position, i.e. when the stop surfaces 14, 15 abut each other. In the embodiment shown in FIG. 4, the through hole 16 of the chainring 1 also has an internal thread so that the external thread of the locking screw 17 engages the internal thread of the through hole 16 and the internal thread of the threaded hole 18 of the adapter. By inserting and screwing the locking screw 17 into the internal threads of the through hole 16 and the threaded hole 18, the chainring 1 is locked to the adapter 2 and cannot be separated from the adapter 2 by rotation in the opposite direction. It is apparent to the person skilled in the art that more than one protrusion 10 or all of the protrusions 10 may have through holes for receiving locking screws that are screwed into corresponding threaded holes of the adapter.

Figure 6:
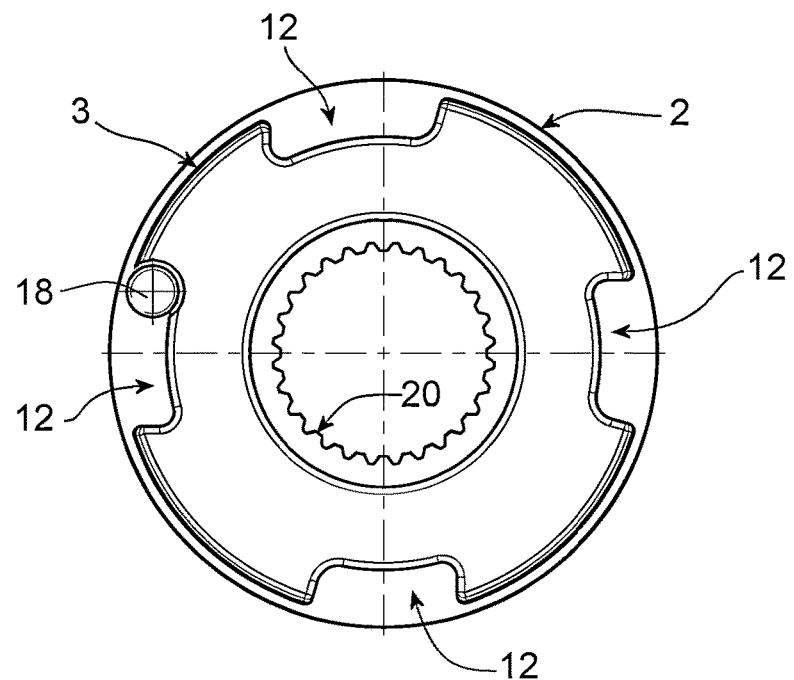
FIG. 6 shows a plan view of the first adapter FIGS. 1, 3 and 4 viewed from a first side.
Figure 7:
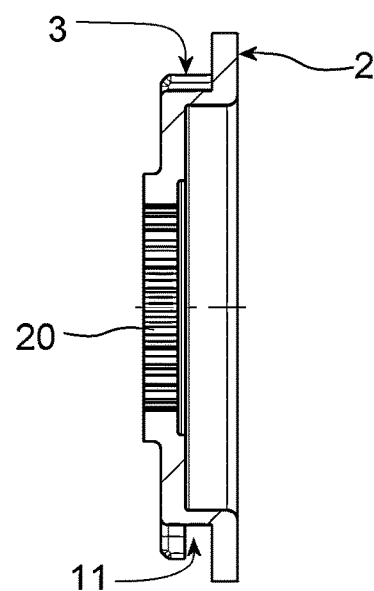
FIG. 7 shows a sectional view of the adapter of FIG. 6 along line VII.-VII.
Figure 8:
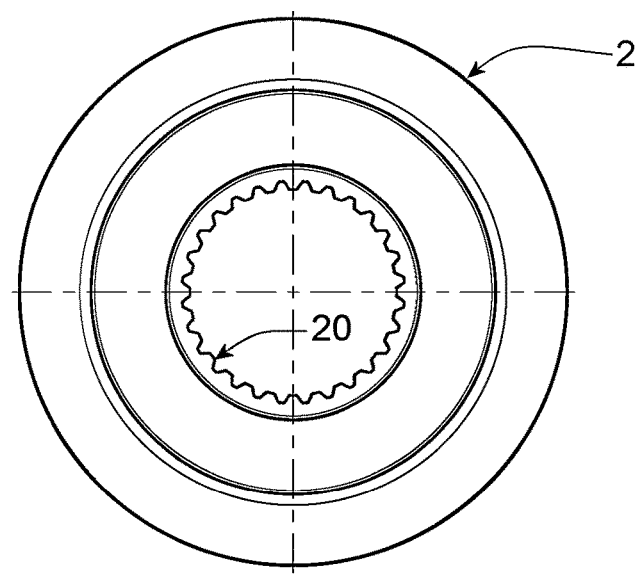
FIG. 8 shows a plan view of the adapter of FIG. 6 viewed from a second side.

FIGS. 6-8 show that the annular adapter 2 has a central opening 19 with a splined surface 20. The diameter and the teeth or splines on the surface 20 match the diameter and splines of a corresponding outer surface of a drive shaft, in the present case a motor shaft. The splined surface 20 is the interface that engages the drive shaft. However, it is apparent to the person skilled in the art that the central opening 19 of the adapter may also be configured to match corresponding splines on a cylindrical projection of a pedal crank or on a spindle of a bottom bracket.

Figure 9:
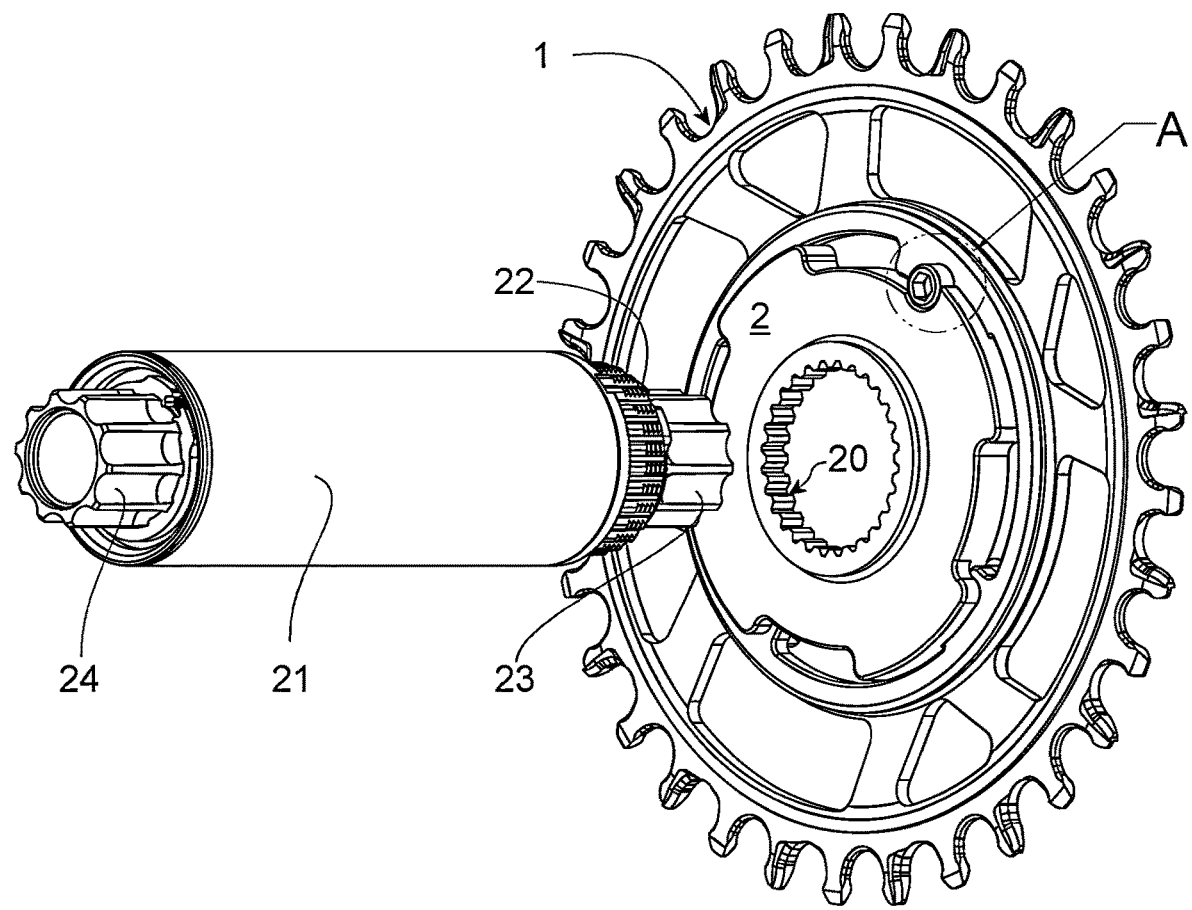
FIG. 9 shows an exploded view of a bottom bracket spindle with an assembly of a chainring and an adapter of FIGS. 1 and 3-8.

FIG. 9 shows the spindle 21 of a bottom bracket of a bicycle and the assembly comprising the chainring 1 and the adapter 2 described below. The spindle 21 comprises a splined interface 22 and an interface 23 for fixing a pedal crank on its axial end on the right hand side in FIG. 9. The shape of the splined interface 22 matches the splined surface 20 of the central hole of the annular adapter 2 so that the adapter 2 can be attached to the spindle in a rotationally fixed manner. The axial end of the spindle 21 on the left hand side in FIG. 9 comprises a second interface 24 for the second crank.

Figure 10:
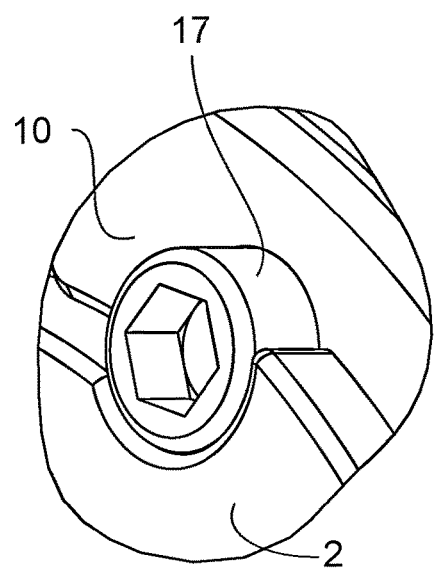
FIG. 10 shows an enlarged view of detail A in FIG. 9.

FIG. 10 shows an enlarged view of the locking screw 17 extending through the through hole of the protrusion 10 of the chainring and screwed into the threaded hole of the adapter. As explained above, the splined interface 20 of the adapter 2 may alternatively engage a corresponding interface of a pedal crank or of the motor shaft of an electric motor, if the adapter is used on a pedelec.

REFERENCE SIGNS LIST 1 chainring
2, 2' annular adapter
3, 3' peripheral wall
4 axis of rotation
5 outer ring section
6 tooth
7 inner ring section
8 arm
9 arm
10 protrusion
11 groove
12 insertion opening
13 lateral face
14 stop surface
15 front surface, stop surface
16 through hole
17 locking screw
18 threaded hole
19 central opening
20 splined surface, interface
21 bottom bracket spindle, drive shaft
22 splined interface
23 interface for crank
24 interface for crank
d1 first axial distance between interface and connecting elements in chainring plane
d2 second axial distance between interface and connecting elements in chainring plane

The invention claimed is:

1. A drive system comprising a drive shaft (21) and a chainring (1), wherein the drive shaft (21) has a splined interface (22) for attaching the chainring (1) in a rotationally fixed manner,
an annular adapter (2, 2') having a radially inner surface with an interface (20) engaging the splined interface (22) of the drive shaft (21) and a radially outer region with at least one first connecting element, wherein the chainring (1) has at least one second connecting element configured to engage said first connecting element,
wherein the drive system comprises a first annular adapter (2) with a first axial extension defining a first axial distance (d1) between the interface (20) and the first connecting element and a second annular adapter (2') with a second axial extension defining a second axial distance (d2) between the interface (20) and the first connecting element.

2. The drive system of claim 1, wherein the annular adapter (2, 2') has a set of first connecting elements and the chainring (1) has a corresponding set of second connecting elements each of which matches one of the first connecting elements.

3. The drive system of claim 2, wherein the first connecting elements and the second connecting elements can be fitted into one another in an assembly position, and the annular adapter (2) and the chainring (1) can be rotated relative to one another about the axis of rotation of the chainring (1) into a stop position in which stop surfaces (14, 15) of the adapter (2) and the chainring (1) abut against one another.

4. The drive system of claim 2, wherein the first connecting elements in the radially outer region of the annular adapter (2) are grooves (11) that extend circumferentially over a portion of the cylindrical outer surface of the adapter (2), the grooves (11) having an insertion opening (12) extending to a lateral face of the adapter (2) at one end and a first stop surface (14) at the other end, wherein the second connecting elements are protrusions (10) on a radially inner surface of the chainring (1) configured to be inserted into said insertion openings (12) and rotated into said grooves (11), wherein the front surfaces of the protrusions (10) are second stop surfaces (15).

5. The drive system of claim 1, further comprising a locking element for locking the adapter (2, 2') and the chainring (1) in the stop position.

6. The drive system of claim 4, wherein the locking element is a locking screw (17) configured to be screwed into a threaded hole (18) in at least one of the chainring (1) and the annular adapter (2).

7. The drive system of claim 1, wherein the annular adapter (2, 2') has at least three first connecting elements distributed at regular intervals over the circumference of the annular adapter (2, 2') and wherein the chainring (1) has a matching number of second connecting elements located at matching positions.

8. The drive system of claim 1, wherein the drive shaft is at least one of:
a bottom bracket spindle (21);
a shaft of an electric drive;
a protrusion of a drive crank.

9. A method for manufacturing a vehicle with a chain drive system comprising a drive shaft (21) and a chainring (1), wherein the drive shaft (21) has splines for attaching the chainring (1) in a rotationally fixed manner, characterized in that a set of annular adapters (2, 2') according to claim 1 is provided,
each adapter (2, 2') having a radially inner surface with an interface (20) engaging the splines of the drive shaft (21) and a radially outer region with at least one first connecting element, wherein the chainring (1) has at least one second connecting element configured to engage said first connecting element for attaching the chainring (1) to the adapter (2, 2') in a formfitting manner,
and each of the adapters (2, 2') of the set having a different axial distance between the interface (20) and the first connecting element,
selecting and mounting the adapter (2 or 2') with the appropriate axial distance between the interface (20) and the first connecting element.

* * * * *